UNITED STATES PATENT OFFICE.

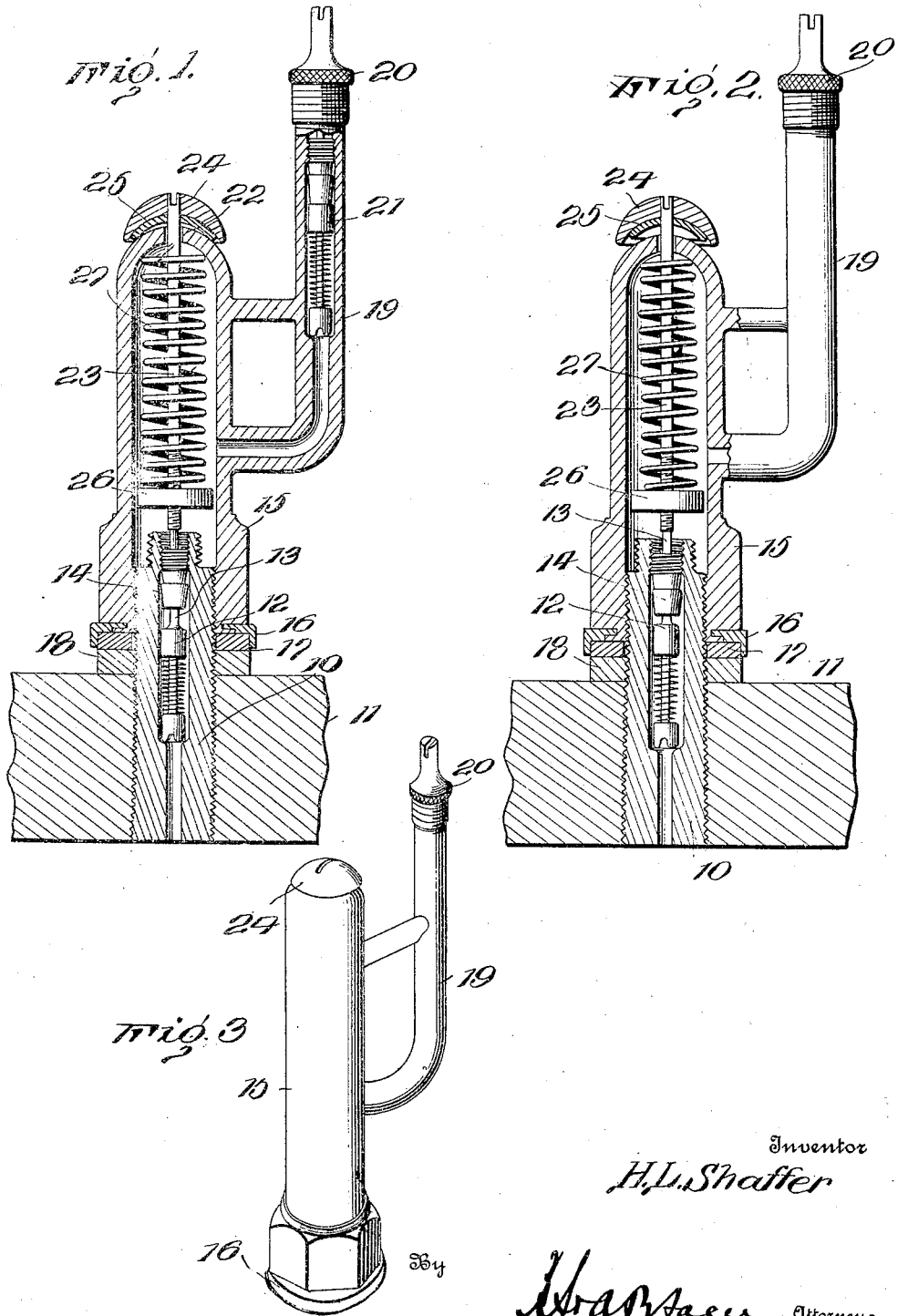

HENRY L. SHAFFER, OF WASHINGTON, IOWA.

RELIEF-VALVE FOR PNEUMATIC TIRES.

1,234,940.  Specification of Letters Patent.  Patented July 31, 1917.

Application filed December 31, 1915. Serial No. 69,600.

*To all whom it may concern:*

Be it known that I, HENRY L. SHAFFER, a citizen of the United States, residing at Washington, in the county of Washington and State of Iowa, have invented certain new and useful Improvements in Relief-Valves for Pneumatic Tires, of which the following is a specification.

This invention contemplates an improved relief valve for pneumatic tires and has as its primary object to provide a device of this character which will be embodied in a cap designed to be fitted over the outer end of the valve stem of a motor vehicle tire to coact with the valve in the said stem and adapted to automatically vent the tire at a predetermined air pressure therein.

The invention has as a further object to provide a device of this character which will automatically act to relieve the vehicle tire of undue air pressure such as may be caused by climatic conditions or by heat generated from friction upon the tire in passing over a road surface tending to expand the air within the tire, so that the universal trouble of blow-outs brought about by these agencies will be eliminated.

A further object of the invention is to provide a relief valve of this character wherein the valve will be adjustable to vent the tire at any predetermined air pressure therein.

The invention has as a further object to provide a device of this character wherein the cap will be movable upon the valve stem to bodily adjust the relief valve relative to the valve of the stem to normally coöperate therewith.

And the invention has as a still further object to provide a relief valve of this character wherein air may be introduced into the vehicle tire without removing the cap carrying the relief valve from the valve stem of the tire.

Other and incidental objects will appear as the description proceeds and in the drawings wherein I have illustrated the preferred embodiment of the invention and wherein similar reference characters designate corresponding parts throughout the several views, Figure 1 is a vertical sectional view showing my improved device applied to a valve stem of conventional type and illustrating the relief valve in normal closed position to shut off the escape of air through the valve stem, Fig. 2 is a similar view showing the relief valve in open position to permit the escape of air through the valve stem, and Fig. 3 is a perspective view showing the device detached.

In order to clearly bring out the manner in which my improved relief valve is adapted to automatically coöperate with the valve of a pneumatic tire, I have, in the drawings, illustrated a conventional type of nipple 10 usually employed in connection with such tires, this nipple being fitted through the wheel felly 11 and having a typical valve 12 arranged therein. The valve 12 is provided with a stem 13 normally arranged to project out of the open end of the nipple and spring pressed to engage the seat 14 for closing the passage through the nipple.

In carrying out my invention, I employ a casing 15 which is detachably screw threaded over the outer end of the nipple and is preferably provided at its lower extremity with the usual wrench receiving enlargement. Swiveled onto the lower end of the casing is an annular washer receiving ring 16 which carries a suitable washer 17. The washer 17 is adapted to coöperate with a nut 18 screw threaded onto the nipple to provide a tight joint between the casing and the nut. The washer 17 may be formed of fiber, rubber or any other suitable material.

Communicating with the casing 15 upon one side thereof is an air tube or conductor 19 which curves laterally away from the casing and is then extended longitudinally to project above the upper end thereof to detachably receive a cap 20. Removably fitted into the upper extremity of the tube 19 is a conventional type of intake valve 21 which normally closes the passage through said tube and is adapted for automatic operation to permit the introduction of air through the tube into the casing 15, the tube projecting above the upper end of the casing a distance sufficient to permit the application of an ordinary hose connection.

The casing 15 at its outer end is provided with a rounded terminal and formed therein is a vent opening 22. Disposed above the casing is a relief valve having a stem 23 which projects freely through the opening 22 and is provided at its outer extremity with an annular head 24 which is fixed to the stem and is formed with a concave inner face. Arranged upon the concave face of the head 24 is a suitable washer or gasket 25 which surrounds the stem 23 and is adapted to seat against the convex outer face of the end of the casing to close the opening 22 therein. The gasket 25 may be formed of rubber, fiber, or any other suitable material.

Adjacent its inner extremity, the stem 23 is screw threaded to adjustably receive an annular nut or disk 26 and interposed between the said nut and the outer end of the cap is a helical spring 27 which surrounds the stem, the spring bearing against the nut to normally urge the head 24 to seat against the outer end of the casing.

It will now be observed that the stem 23 of the relief valve is adapted to engage the outer end of the stem 13 of the valve 12 to hold said last mentioned valve away from its seat 14. Air within the inner tube (not shown) will then be permitted to flow through the nipple 10 and past the valve 12 into the casing 15 when the air pressure within the said tube and the casing will become equal. Under these conditions, the spring 27 will normally hold the relief valve in closed position as shown in Fig. 1 to prevent the escape of air through the opening 22 in the casing while the valve 21 will operate to prevent the escape of air through the tube 19.

As will now be clear, by properly adjusting the nut 26 longitudinally upon the stem 23 of the relief valve, the spring 27 may be tensioned to hold the relief valve closed under a greater or less air pressure within the inner tube. Should the air pressure within the said inner tube, for any reason, become greater such increased pressure will act to move the head 24 of the relief valve away from the opening 22, as shown in Fig. 2, to permit the escape of air from the inner tube. The relief valve may thus be adjusted to vent the inner tube at any predetermined air pressure and upon the escape of sufficient air from the tube to reduce the air pressure therein to the normal point, the spring 27 will then act to again close the relief valve. Preferably, the head 24 of the relief valve is provided with a slot as illustrated in the drawings, adapted to receive a screw driver or other tool so that the adjustment of the nut 26 to tension the spring may be easily and quickly accomplished.

As is well known, the friction of a vehicle tire upon the road surface in passing thereover will, through the medium of the heat generated thereby, materially increase the air pressure within the tire and this often results in blow-outs. Climatic conditions during the summer months very often bring about a similar result. As will be seen, by the use of my improved relief valve, such blow-outs may be entirely eliminated.

Upon an inspection of Fig. 2, it will be observed that when the head of the relief valve is moved away from its seat, to vent the inner tube of the tire the valve 12 will be correspondingly moved toward the seat 14 and tend to assume a position to close the passage through the nipple. Accordingly, it is necessary to so adjust the relief valve in its normal position relative to the valve 12 that the relief valve will be moved to open position before the valve 12 is moved to closed position. This adjustment may be had by properly moving the casing 15 upon the nipple 10 to bodily position the relief valve relative to the valve 12 in such manner that the stem 23 of the relief valve will normally hold the valve 12 away from its seat 14 a distance sufficient to permit the head 24 of the relief valve to leave its seat before the valve 12 engages with its seat 14. After the casing 15 has been properly adjusted longitudinally of the stem 10, the nut 18 may be moved to engage the washer 17 of the cap to provide a tight joint therebetween.

It will therefore be seen that I provide a very simple and efficient construction for the purpose set forth and one which will be entirely automatic in its operation. The casing 15 may be applied to any conventional type of valve nipple and air may be introduced through the nipple into the tire by simply removing the cap 20 of the tube 19 and without the necessity of removing the casing 15. The casing 15 need not therefore be molested in its adjustment upon the stem once the casing has been arranged in position, and in this connection, it will be observed that the nut 18 when in engagement with the washer of the casing 15, will act as a locking member tending to hold the casing against rotation upon the nipple after adjustment.

Having thus described my invention, what I claim and desire to secure by Letters Patent is:

1. The combination with a tire valve including a nipple, of a casing detachably secured to the nipple and having its upper end convex and provided with a vent opening a relief valve having a concave face fitting over the convex end of the casing and provided with a depending stem extending through the vent opening and coacting with the tire valve for holding the latter in open position, and a spring arranged within the casing for normally holding the relief valve in closed position, said relief valve being movable to open position to permit the escape of air through the vent opening when the air pressure in the tire becomes excessive.

2. A safety device for attachment to the nipple of a pneumatic tire valve comprising a casing having its upper end convex and provided with a vent opening, a relief valve arranged on the exterior of the casing and having its lower face concave, a gasket fitting the concave face of the relief valve and bearing against the convex end of the casing, a stem depending from the relief valve and extending through the vent opening for connection with the tire valve for holding the latter in open position, and a spring arranged within the casing for normally holding the relief valve to its seat, said relief valve being movable to open position to permit the escape of air through the vent opening when the air pressure in the tire becomes excessive.

In testimony whereof, I affix my signature.

HENRY L. SHAFFER. [L. S.]